United States Patent [19]

Sawazaki

[11] Patent Number: 4,489,278

[45] Date of Patent: Dec. 18, 1984

[54] ELECTROSTATIC VOLTAGE DETECTING DEVICE

[75] Inventor: Norikazu Sawazaki, Yokohama, Japan

[73] Assignee: Tokyo Shibaura Denki Kabushiki Kaisha, Kawasaki, Japan

[21] Appl. No.: 384,605

[22] Filed: Jun. 3, 1982

[51] Int. Cl.³ .............................................. G11B 11/06
[52] U.S. Cl. .................................... 324/457; 324/113; 324/452; 369/151
[58] Field of Search .......... 369/151; 324/78 E, 79 R, 324/79 D, 81, 61 QS, 454, 458, 452, 457, 109, 113

[56] References Cited

U.S. PATENT DOCUMENTS

| | | | |
|---|---|---|---|
| 2,423,208 | 7/1947 | Sinnett | 369/151 |
| 2,426,061 | 8/1947 | Snepvangers | 369/151 |
| 2,445,990 | 7/1948 | Badmaeiff | 369/151 |
| 2,532,060 | 11/1950 | Dicke | 369/151 |
| 2,615,960 | 10/1952 | Erwin | 369/151 |
| 2,843,679 | 7/1958 | Hogue | 369/151 |
| 2,847,515 | 8/1958 | Parker | 369/151 |
| 2,851,540 | 9/1958 | Theriault | 369/151 |
| 3,005,060 | 10/1961 | Weathers | 369/151 |
| 3,195,037 | 7/1965 | Van Nie | 324/109 |
| 4,371,961 | 2/1983 | Rose | 369/151 |

Primary Examiner—Stewart J. Levy
Attorney, Agent, or Firm—Oblon, Fisher, Spivak, McClelland & Maier

[57] ABSTRACT

An electrostatic voltage detecting device includes a detecting electrode for detecting an electrostatic voltage generated by charge on a recording medium, a variable capacitance diode whose capacitance changes according to an output signal applied from the detecting electrode, a primary coil combined with the variable capacitance diode to form a resonance circuit, an oscillator for supplying an oscillating output signal of predetermined frequency to the primary coil, and a secondary coil inductively coupled with the primary coil. The capacitance of the variable capacitance diode changes according to an output voltage applied from the detecting electrode to vary a resonance frequency of the resonance circuit and consequently a voltage induced in the secondary coil.

5 Claims, 5 Drawing Figures

F I G. 5
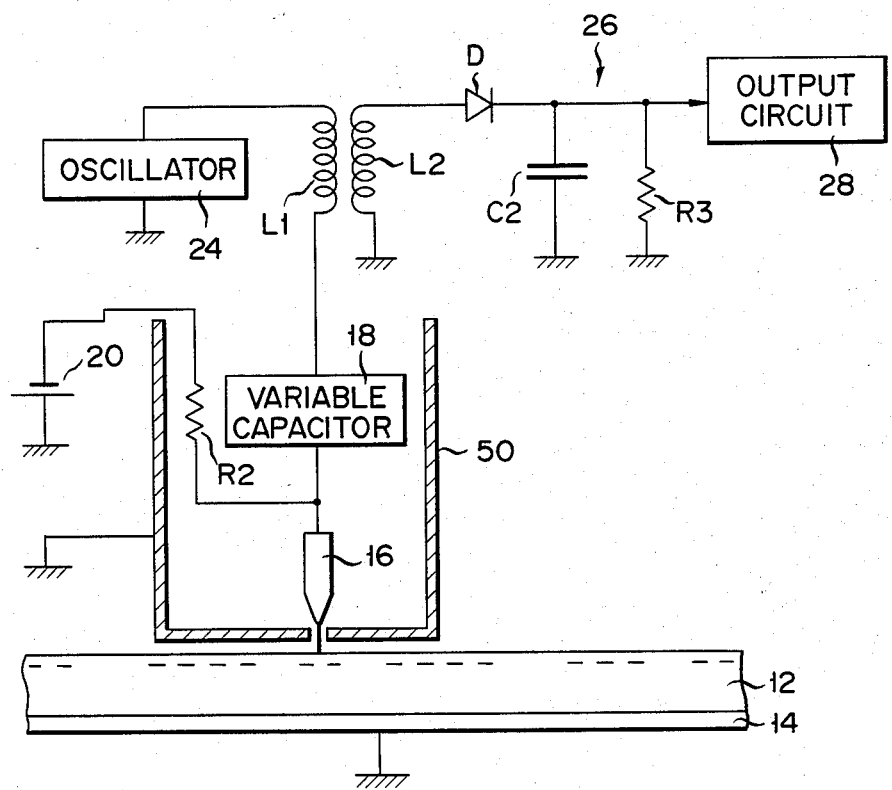

ELECTROSTATIC VOLTAGE DETECTING DEVICE

BACKGROUND OF THE INVENTION

The present invention relates to an electrostatic voltage detecting device for detecting electrostatic voltage generated by electrostatic induction.

There is known a device for electrostatically recording and reproducing information signal such as picture image and sound. The electrostatic recording and reproducing device of this type has a recording medium including an insulating plate 2 formed of an insulative material such as Teflon (trade name) and capable of storing electric charge, and a conductive layer 4 formed on the insulating plate 2, as shown in FIG. 1. Information signal is recorded in the form of signal charge by applying a signal voltage to a metal needle electrode (not shown), which is moved relative to the insulating plate 2, so as to inject into the insulating plate 2 charges of an amount corresponding to the signal voltage applied. When it is required to read out information signal thus recorded, a reproducing electrode 6 is moved relative to the insulating plate 2 to generate a voltage between the reproducing electrode 6 and the signal charge. Electrostatic voltage thus sensed is applied, as a reproducing signal, to an output circuit 8 through a CR circuit which includes a resistor R1 and a capacitor C1, whereby a static distribution of electric charge stored in the insulating plate 2 can be detected. In the case of this electrostatic reproducing device, however, it is impossible to obtain a reproducing signal having a level accurately corresponding to the quantity of electrostatic charge injected into the insulating plate 2. In addition, this reproduced signal is low in its S/N ratio.

SUMMARY OF THE INVENTION

An object of the present invention is to provide an electrostatic voltage detecting device capable of detecting with high sensitivity electrostatic voltage generated by electrostatic induction.

According to the present invention is provided an electrostatic voltage detecting device comprising detecting means for detecting electrostatic voltage generated by charge stored in a recording medium, variable capacitance means whose capacitance changes according to an output voltage of the detecting means, inductance means cooperating with the variable capacitance means to form a resonance circuit whose resonance frequency changes according to the capacitance of the variable capacitance means, and means for detecting a change in the resonance frequency of the resonance circuit and generating an output signal corresponding to this frequency change.

In the present invention, the variable capacitor having its capacitance changed according to a detected electrostatic voltage is used to form the resonance circuit. Therefore, the distribution of charge stored in the recording medium can be detected with high accuracy by detecting the change in the resonance frequency of the resonance circuit.

BRIEF DESCRIPTION OF THE DRAWINGS

FIG. 5 is a circuit diagram showing a modification of the electrostatic reproducing device of FIG. 1.

DETAILED DESCRIPTION OF THE PREFERRED EMBODIMENTS

Figure 2:
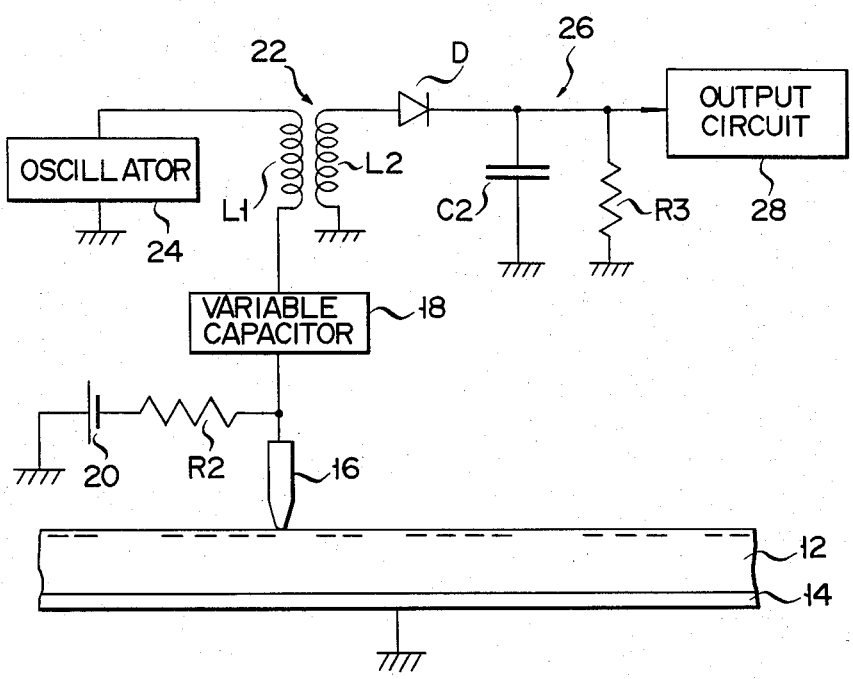
FIG. 2 is a circuit diagram of an electrostatic reproducing device in which an electrostatic voltage detecting device according to one embodiment of this invention is employed.

FIG. 2 shows the reproducing section of an electrostatic recording and reproducing system which includes an electrostatic voltage detecting device of one embodiment according to the present invention. The electrostatic voltage detecting device includes an insulating film 12 made of a material such as Teflon (trade name) and capable of storing electric charge, a conductive layer 14 formed on a surface of the insulating film 12, and a conductive reproducing electrode 16 which is placed adjacent to or in contact with the other surface of the insulating film 12 and moved relative to the insulating film 12 to detect electostatic voltage generated by electrostatic induction due to electrostatic charge injected into the other surface area of insulating film 12. The electrostatic voltage detecting device further includes a variable capacitor 18 such as variable capacitance diode whose capacitance changes according to an output voltage of the reproducing electrode 16, the output voltage having a level corresponding to the quantity of charge at a portion currently detected, a battery 20 for applying a predetermined DC reverse bias voltage to the variable capacitance diode 18 through a resistor R2, superposing it on an output voltage of the reproducing electrode 16, a resonance transformer 22 having a primary winding L1 combined with the variable capacitance diode 18 to form a resonance circuit, an oscillator 24 for supplying an output voltage of predetermined frequency to the resonance circuit, and a detector circuit 26 connected to a secondary winding L2 of the resonance transformer 22 and including a diode D, a capacitor C2 and a resistor R3.

The battery 20 supplies a predetermined DC reverse bias voltage to the cathode of the variable capacitance diode 18 in such a way that the resonance circuit formed of the primary winding L1 and the variable capacitance diode 18 has a resonance frequency substantially equal to an output frequency of the oscillator 24. The reproducing electrode 16 superposes its output voltage corresponding to the quantity of charge stored at a local area of the insulating film 12 on the DC reverse bias voltage applied from the battery 20 and applies the result to the cathode of the variable capacitance diode 18. When the reproducing head 16 is moved relative to the insulating film 12, it generates an output voltage whose level changes in accordance with the quantity of charge stored at an area of the insulating film 12 to be detected. Therefore, the capacitance of the variable capacitance diode 18 changes according to the quantity of charge at an area of the insulating film 12 facing the foremost end of the reproducing head 16. The resonance frequency of the resonance circuit formed of the primary winding L1 and the variable capacitance diode 18 changes accordingly and shifts from the center frequency of the oscillator 24. As the result, the resonance circuit displays a large impedance characteristic with respect to the oscillator 24 and a current flowing to the primary winding L1 is reduced and accordingly a voltage induced across the secondary winding L2 is reduced. This induced voltage is supplied to the output circuit 28 via the detector circuit 26.

According to this embodiment, the amplitude of a reproduced signal can be set within an appropriate level range and the S/N ratio can be made small by appropriately adjusting the oscillating output of the oscillator 24, the resonance characteristic of resonance circuit formed of the primary winding L1 and the variable capacitance diode 18, and the coefficient of coupling between the primary and secondary windings L1 and L2.

Figure 3:
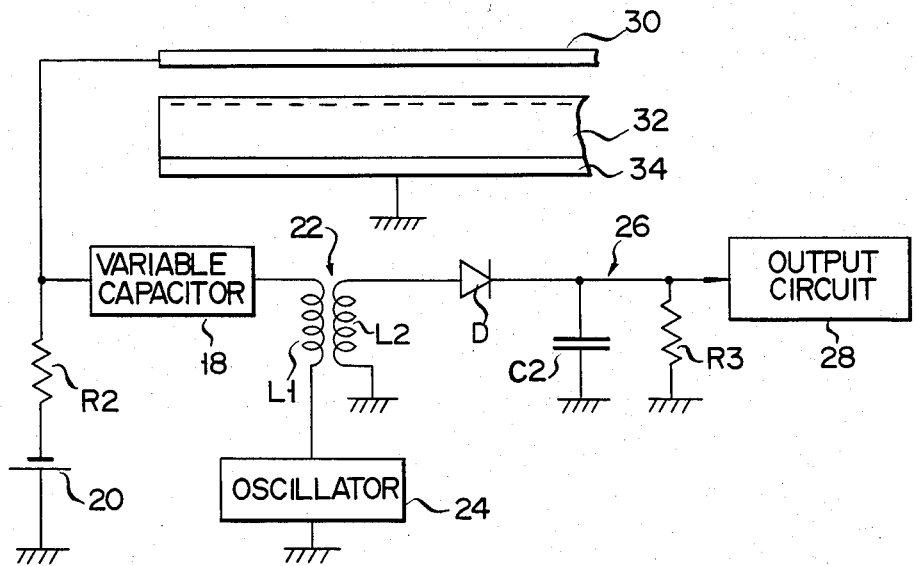
FIG. 3 is a circuit diagram showing a condenser microphone in which an electrostatic voltage detecting device according to another embodiment of this invention is employed.

FIG. 3 shows a condenser microphone in which another example of electrostatic voltage detecting device according to the present invention is employed. This electrostatic voltage detecting device is similar in arrangement to the one shown in FIG. 2 except that a diaphram electrode 30 is used instead of the reproducing electrode 16. As well known, the diaphram electrode 30 is arranged facing the front surface of an electret plate 32 which has an electrode 34 formed on the back surface and grounded. Electric charge is uniformly stored in the front surface area of the electret plate 32. When the diaphram 30 is vibrated, a capacitance between the diaphram 30 and the electret plate 32 changes and a voltage applied to the variable capacitance diode 18 through the diaphram 30 also changes. A signal voltage is excited through the primary winding L1 as described above and supplied to the output circuit 28 through the detector circuit 26. According to this second embodiment, a signal is generated in accordance with the vibration of the diaphram 30 at a high S/N ratio over a relatively wide range of amplitude.

Figure 4:
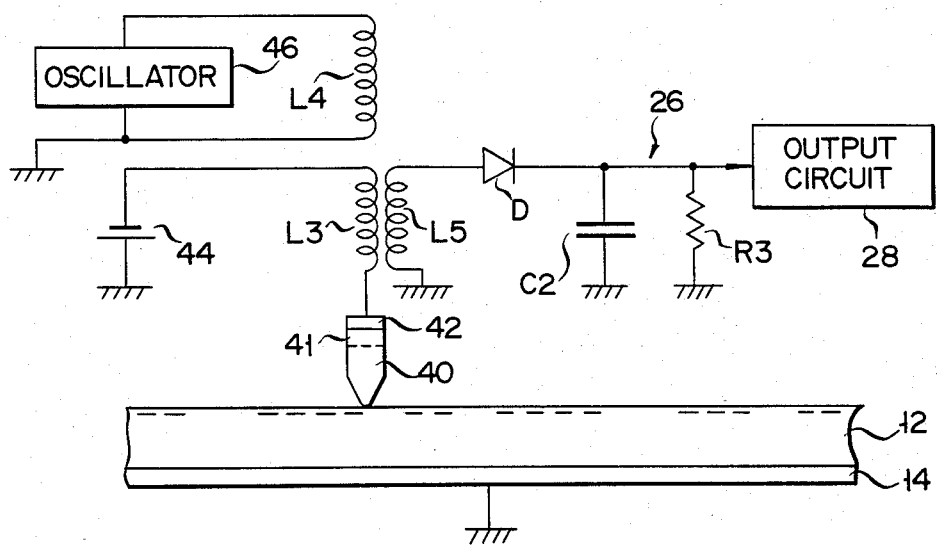
FIG. 4 is a circuit diagram showing an electrostatic reproducing device in which an electrostatic voltage detecting device according to a further embodiment of this invention is employed.

FIG. 4 shows the reproducing section of an electrostatic recording and reproducing system which includes a further example of electrostatic voltage detecting device according to the present invention. The electrostatic voltage detecting device is provided with a semiconductor needle 40 made of a material such as P-type silicon, a metal electrode 42 formed on the top of the semiconductor needle 40, a battery 44 for applying a reverse bias voltage between the metal electrode 42 and the semiconductor needle 40 through a coil L3, and an oscillator 46 for exciting a coil L4 inductively coupled with the coil L3. Since a predetermined reverse bias voltage is applied between the semiconductor needle 40 and the metal electrode 42, a depletion layer 41 is formed at the end portion of the semiconductor needle 40 where the semiconductor needle 40 contacts the metal electrode 42. The width of depletion layer 41 changes according to the quantity of charge detected by the semiconductor needle 40 when the semiconductor needle 40 is moved relative to the insulating plate 12 and along the surface of the insulating plate 12. Namely, the resonance frequency of the serial resonance circuit formed of the depletion layer 41 of the semiconductor needle 40 and the coil L3 changes in accordance with the charge distribution at the surface area of the insulating plate 12. Therefore, a current flowing through the coil L3 changes according to the change in the quantity of charge in the surface area of the insulating plate 12. As the result, a voltage induced through a coil L5 which is inductively coupled with the coil L3 changes, too. This induced voltage is supplied through the detector circuit 26 to the output circuit 28. Since the extent to which resonance frequency of the resonance circuit is shifted from the center oscillating frequency of the oscillator 46 also changes in accordance with the distribution of the surface charge of the insulating plate 12 in this embodiment, a voltage signal having a wide range of amplitude and a large S/N ratio can be generated through the coil L5 by appropriately setting the oscillating output of the oscillator 46 and the resonance characteristic of the resonance circuit.

Figure 1:
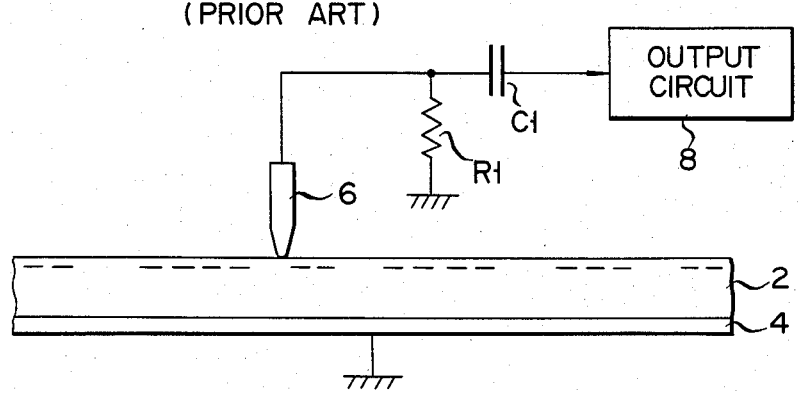
FIG. 1 is a circuit diagram schematically showing the reproducing section of a conventional electrostatic recording and reproducing device.

FIG. 5 shows a modification of the producing device shown in FIG. 1. The reproducing device is similar to that of FIG. 1 except that the reproducing electrode 16 has an extremely thin metal film or wire on the tip end thereof and a metal shield box 50 is further provided in which the reproducing electrode 16, variable capacitance diode 18 and resistor R2 are received. The bottom wall of the shield box has an opening through which the thin metal film or wire of the reproducing electrode 16 extends outwardly. The shield box 50 is so mounted that the bottom wall may be placed near and substantially in parallel to the insulating film 12. Use of the shield box 50 protects the reproducing electrode 16 from being affected by charges shored in other portions than a portion currently detected. Further, since, in this example, the extremely thin metal film or wire is used, signal information can be recorded and reproduced with a high resolution.

Although the present invention has been described referring to some embodiments, it should be understood that the present invention is not limited to these embodiments. In the embodiment shown in FIG. 3, for example, the electret plate 32 may be removed and high voltage may be applied between the diaphram electrode 30 and the back surface electrode 34 to change the capacitance of variable capacitance diode 18 in accordance with the vibration of the diaphram electrode 30. A pickup stylus for tracing the groove on a record disc may be employed instead of the diaphram electrode 30 in the embodiment shown in FIG. 3 to form a condenser pickup.

Oscillating frequency of the oscillator is set substantially equal to center resonance frequency of the resonance circuit in the above-described embodiments, but the oscillating frequency may be set apart from the center resonance frequency where the resonance circuit has a gentle resonance characteristic. The semiconductor needle 40 is made of P-type silicon in the embodiment shown in FIG. 4, but it may be made of N-type silicon.

What is claimed is:

1. An electrostatic voltage detecting device comprising:

detecting means provided with a semiconductor member arranged movably along the surface of a recording medium to detect electrostatic voltage generated by the surface charge of said recording medium, and a metal electrode connected to part of said semiconductor member to form a depletion layer in the semiconductor member, the width of the depletion layer changing in accordance with a voltage detected by the semiconductor member;

first inductance means connected to the metal electrode and combined with said detecting means to form a resonance circuit whose resonance frequency changes in accordance with the width of the depletion layer formed in said semiconductor member;

signal generating means including second and third inductance means inductively coupled with the first inductance means, an oscillating circuit for supplying an oscillating output signal of predetermined frequency to the second inductance means, and a detector circuit connected to the third inductance means to detect a voltage signal excited through the third inductance means; and bias means for applying a DC bias voltage to the semiconductor member through the metal electrode and the first inductance means, the DC bias voltage being superposed on a voltage detected by the semiconductor member to determine the width of the depletion layer formed in said semiconductor member.

2. An electrostatic voltage detecting device according to claim 1, wherein said detecting means includes a conductive detecting electrode movable along the surface of said recording medium and relative to the recording medium to detect the surface charge of said recording medium.

3. An electrostatic voltage detecting device according to claim 1, wherein said detecting means includes an electrode plate arranged vibratory and facing said recording medium.

4. An electrostatic voltage detecting device according to claim 3, wherein said signal generating means includes an oscillating circuit for supplying an oscillating output signal of predetermined frequency to said first inductance means, second inductance means inductively coupled with said first inductance means, and a detector circuit connected to said second inductance means.

5. An electrostatic voltage detecting device according to claim 1, in which said detecting means is formed of a conductive needle electrode and which further comprises metal shield means at least partially surrounding said detecting means and variable capacitance means and having a shield portion adapted to face said recording medium, said shield portion having an opening through which a tip end of said needle electrode extends outside of said shield means.

* * * * *